//www.pagefree.com

United States Patent [19]

Endo et al.

[11] Patent Number: 5,178,925
[45] Date of Patent: Jan. 12, 1993

[54] MAGNETIC DISC HAVING A MAGNETIC LAYER WITH A GLASS TRANSITION TEMPERATURE OF AT LEAST 75° C. WHICH CONTAINS MAGNETIC METAL POWDER OF SPECIFIED PH AND SURFACE AREA

[75] Inventors: Yasushi Endo, Kanagawa, Japan; Mikihiko Kato, Brookline, Mass.; Yasuo Nagashima; Toshio Kawamata, both of Kanagawa, Japan

[73] Assignee: Fuji Photo Film Co., Ltd., Kanagawa, Japan

[21] Appl. No.: 609,844

[22] Filed: Nov. 7, 1990

[30] Foreign Application Priority Data

Nov. 7, 1989 [JP] Japan .................................. 1-289316

[51] Int. Cl.$^5$ ................................................ G11B 5/00
[52] U.S. Cl. .......................................... 28/64; 428/65; 428/336; 428/403; 428/424.6; 428/425.1; 428/425.9; 428/522; 428/694; 428/900

[58] Field of Search ................. 428/694, 900, 64, 403, 428/336, 424.6, 425.1, 425.9, 522, 65; 252/62.55

[56] References Cited

U.S. PATENT DOCUMENTS 4,968,557 11/1990 Ejiri et al. ............................ 428/323
4,985,314 1/1991 Merriam et al. ..................... 428/694

Primary Examiner—Paul J. Thibodeau
Assistant Examiner—Stevan A. Resan
Attorney, Agent, or Firm—Sughrue, Mion, Zinn, Macpeak & Seas

[57] ABSTRACT

A magnetic disc having excellent running durability is disclosed, which comprises a non-magnetic support and a magnetic layer on the non-magnetic support, the layer being composed mainly of a ferromagnetic metal powder and a binder resin, wherein the ferromagnetic metal powder has a pH value of less than 7.0 and a specific surface area as determined by the BET method of at least 40 m$^2$/g, and the glass transition temperature of the magnetic layer is at least 75° C.

14 Claims, No Drawings

MAGNETIC DISC HAVING A MAGNETIC LAYER WITH A GLASS TRANSITION TEMPERATURE OF AT LEAST 75° C. WHICH CONTAINS MAGNETIC METAL POWDER OF SPECIFIED PH AND SURFACE AREA

FIELD OF THE INVENTION

The present invention relates to magnetic discs, and, more particularly, to magnetic discs comprising a ferromagnetic metal powder-containing coating wherein the magnetic discs are provided with excellent running durability.

BACKGROUND OF THE INVENTION

An increasing demand for higher density recording capability has arisen for a magnetic recording medium with a magnetic layer comprising a ferromagnetic powder and a binder resin as main components. One of the conventional approaches to obtain higher density recording is to smooth the surface of the magnetic layer.

However, this approach has the drawback in that during running of a magnetic recording medium in which the surface of the magnetic layer has been made smooth, a coefficient of friction between the magnetic layer and a contact part of an equipment is increased and, as a result, the magnetic layer of the magnetic recording medium is occasionally damaged, or the magnetic layer is sometimes peeled apart, from the support even after only short term use.

Particularly in the case of floppy discs, with the recent popularity and wide-spread use of personal computers, floppy discs are used by a wide variety of users. Thus, floppy discs are used under various environments; and, as a result, the magnetic layer of the floppy disc is often subjected to severe high temperature conditions.

When the floppy disc is used under such severe conditions, a ferromagnetic powder sometimes drops particularly from the magnetic layer, causing clogging of a magnetic head.

It is also known that another means to attain high density recording of a magnetic recording medium is to use a ferromagnetic metal powder as the ferromagnetic powder.

However, when a ferromagnetic metal powder is used in a floppy disc, the magnetic layer is more readily damaged by friction with a jacket or jacket liner than is the case in the use of conventional iron oxide, and drop-out is sometimes experienced. This problem becomes marked when the magnetic layer is used under a relatively higher temperature range of 50° to 60° C., or it is used under such conditions that the temperature is cycled between a high temperature level and a low temperature level.

In order to increase running durability of a magnetic layer, it has been conventionally proposed that fatty acid, or an ester of fatty acid and aliphatic alcohol is added to the magnetic layer as a lubricant, thereby decreasing coefficient of friction.

For example, U.S. Pat. No. 3,833,412 discloses addition of monobasic fatty acids having at least 4 carbon atoms, such as capric acid, lauric acid, and oleic acid, as lubricants; U.S. Pat. No. 3,274,111 discloses addition of fatty acid esters such as butyl laurate, lauryl palmitate, and butyl myristate, of monobasic fatty acids having 12 to 16 carbon atoms and aliphatic alcohols having 3 to 12 carbon atoms, as lubricants; and U.S. Pat. No. 4,303,738 discloses addition of tridecyl stearate as a lubricant.

Moreover, addition of higher fatty acid esters of higher alcohols having a branched molecular structure as lubricants is proposed in JP-A-55-157131, and addition of isocetyl stearate as a lubricant is proposed in JP-A-59-186130 (the term "JP-A" as used herein means an "unexamined published Japanese patent application").

These lubricants, however, tend to reduce the strength of the magnetic layer, although they are effective in decreasing the coefficient of friction. Thus, the lubricants cannot be considered to be sufficiently satisfactory in protecting the magnetic layer from damage due to jacket liner interfriction.

Moreover, a method of increasing the strength of the magnetic layer by using fiber-based resins having a high modulus of elasticity and a high mechanical strength as binder resins is disclosed in, for example, JP-A-56-13519, JP-A-62-239316, JP-A-58-70424, JP-A-58-70425, JP-A-56-74833, JP-A-60-133527, JP-A-62-34326, JP-A-62-26628, JP-A-59-79428, JP-A-57-135439, JP-A-56-74832 and JP-A-59-188827.

However, the conventional fiber-based binder resins such as nitrocellulose are not sufficiently high in dispersion capability therein for a ferromagnetic powder, and, thus, cannot improve the surface properties of the magnetic layer, and, furthermore, cannot increase the degree of packing the ferromagnetic powder. For these reasons, the use of conventional fiber-based binder resins fail to provide a magnetic recording medium having excellent electromagnetic properties.

Moreover, use of phenoxy resins as binder resins is proposed in, for example, JP-A-1-106325, and JP-A-64-39623, and JP-B-57-36647, and JP-B-57-36648 (the term "JP-B" as used herein means an "examined Japanese patent publication"). However, even if these binder resins are used, the durability of the magnetic layer to contact with the liner of a floppy disc storage jacket cannot be increased sufficiently in a magnetic recording medium using a ferromagnetic metal powder.

Moreover, a method of adding an abrasive (hard grains), such as corundum, silicon carbide, and chromium oxide to the magnetic layer is proposed. This method, however, cannot sufficiently protect the magnetic layer from damages due to contact with the liner of the jacket.

SUMMARY

In view of the above prior art problems, the present invention has been accomplished, wherein an object of the present invention is to provide a magnetic disc which is excellent in electromagnetic properties and has good durability, and, thus, which is particularly well-suited for use as a floppy disc.

The present invention relates to a magnetic disc comprising a non-magnetic support and a magnetic layer on the support, said layer being composed mainly of a ferromagnetic metal powder and a binder resin, wherein the ferromagnetic metal powder has a pH value of less than 7.0, and a specific surface area as determined by the BET method of at least 40 $m^2/g$, and the glass transition temperature of the magnetic layer is at least 75° C.

DETAILED DESCRIPTION OF THE INVENTION

The magnetic disc of the present invention is good in electromagnetic properties, because it uses a very fine ferromagnetic metal powder having a specific surface area as determined by the BET method of at least 40 m$^2$/g as a ferromagnetic powder. Moreover, since the glass transition temperature of the magnetic layer is at least 75° C., and the pH of the ferromagnetic powder is less than 7.0, the magnetic disc of the present invention is less susceptible to damages to the magnetic layer due to frictional contact with a jacket liner, and thus is excellent in durability.

Accordingly, the magnetic disc of the present invention has characteristics suitable for a floppy disc having good electromagnetic properties and is excellent in durability.

Although the reason why the durability is increased by using a ferromagnetic metal powder having a pH value of less than 7.0 is not completely understood, it is believed that a decrease in the pH value increases the adsorptivity of the binder resin, making the magnetic layer into an integrated structure and increasing its mechanical properties. As a result, the damage is decreased in the magnetic layer when in frictional contact with the jacket liner, and therefore, the durability as the magnetic disc is increased.

The ferromagnetic metal powder to be used in the magnetic disc of the present invention is a fine powder comprised mainly of iron or iron alloys. Specific examples are metal elements or alloys, such as Fe, Fe-Co, Fe-Ni, and Fe-Ni-Co. In order to improve characteristics of such metals or metal alloys, non-metallic elements such as B, C, Al, Si and P, are sometimes added. To increase the stability against oxidation of the ferromagnetic metal powder, an oxide layer is usually formed on the grain surface.

The specific surface area of the ferromagnetic metal powder is at least 40 m$^2$/g and preferably 40 to 60 m$^2$/g, so as to obtain good electromagnetic properties. If the specific surface area is less than 40 m$^2$/g, electromagnetic properties are not sufficiently high, and, thus, the resolving ability is undesirably poor. On the other hand, if it is more than 60 m$^2$/g, the dispersibility of ferromagnetic metal powder is undesirably decreased.

Moreover, the crystal size of the ferromagnetic metal powder, as determined by the X-ray diffraction method, is desirably not more than 400 Å.

It is desirable that the saturated magnetization of the above ferromagnetic metal powder is at least 110 emu/g, and the coercive force is at least 800 Oe. The powder preferably has an acicular ratio of 5 or more.

The pH value of the above ferromagnetic metal powder is less than 7 and preferably less than 6.8. If the pH value is 7 or more, the wear resistance of the magnetic layer is decreased, and the magnetic layer is damaged by frictional contact with the jacket liner of the floppy disc, and during its running, drop-out of ferromagnetic metal powder will occur.

However, if the pH value is too small, the surface of the ferromagnetic metal is corroded, and magnetic characteristics are reduced as a consequence. Thus, the pH value is preferably at least 5 and more preferably at least 5.5. Therefore, a preferred pH range is from 5 to 6.8 for the ferromagnetic powder.

The pH value of the ferromagnetic metal powder to be used in the magnetic disc of the present invention is measured according to the method prescribed in JIS Z8802-7 (pH measuring method). Specifically, the pH value is measured by placing 5 g of a ferromagnetic metal powder and 100 ml of water, which previously has been rendered free of carbon dioxide gas by boiling, in a hard Erlenmeyer flask, agitating the flask in a stoppered state for 5 minutes, and measuring the pH of a supernatant or filtered liquid by the use of glass electrodes.

The glass transition temperature of the magnetic layer of the magnetic disc of the present invention is at least 75° C., preferably 80° to 160° C., and more preferably 120° to 150° C.

By controlling the glass transition temperature of the magnetic layer to at least 75° C., the abrasive resistance of the magnetic layer against damage from the jacket liner under such conditions that the conditions are varied between higher temperature and lower temperature is markedly increased.

If the glass transition temperature is lower than 75° C., the durability of the magnetic layer is decreased, and the magnetic layer is damaged by jacket liner frictional contact. Thus, the object of the present invention is not attainable if the glass transition temperature is lower than 75° C.

The aforementioned ferromagnetic metal powder to be used in the magnetic disc of the present invention can be obtained by various methods which are conventionally known. In order to control the pH value to less than 7, a method of making various metals or non-metals adsorbed on the surface of the ferromagnetic powder, or a method of dispersing the ferromagnetic powder in an organic solvent and then passing therethrough an oxidizing gas to gradually oxidize the grain surface, for example, is effectively employed. In more detail, reference can be made to *Progress in Organic Coatings*, vol. 10, pp. 195-204 (1982).

Moreover, in order to control the glass transition temperature of the magnetic layer to at least 75° C., it is effective to use two or more binder resins in combination while controlling the glass transition temperature of each binder and the amount of each binder added. Addition of organic additives such as a lubricant in the magnetic layer is effective in lowering the glass transition temperature of the magnetic layer.

The binder resin to be used in the present invention includes conventionally known thermoplastic resins, thermosetting resins, reactive resins, or mixtures thereof. Examples are a vinyl chloride based copolymers such as vinyl chloride-vinyl acetate copolymer, acrylate-based copolymers, methacrylate-based copolymers, urethane elastomers, cellulose derivatives, and an epoxy-polyamide resin. As hardeners, various polyisocyanates are used. The amount of the binder is preferably 5 to 300 parts by weight per 100 parts by weight of the ferromagnetic metal powder. In order to increase dispersibility, it is desirable that a suitable amount of a functional group, such as a carboxyl group, a sulfonic acid group, a hydroxy group, an amino group, or an epoxy group, is introduced into the binder resin molecule.

In preparation of a magnetic layer by combining two or more of the above binder resins, and mixing therewith the above ferromagnetic power and other additives, it is necessary that the glass transition temperature of the magnetic layer is at least 75° C. In this regard, a mixture of 30 to 60 wt% of a vinyl chloride copolymer or a cellulose derivative (e.g., nitrocellulose), 10 to 40 wt% of a polyurethane resin and 20 to 50 wt% of a polyisocyanate is preferably used as a binder resin component, and a mixture of 30 to 60 wt% of a cellulose derivative, 10 to 40 wt% of a polyurethane resin and 10 to 40 wt% of a polyisocyanate is particularly preferred. If the glass transition temperature of the magnetic layer is less than 75° C., the abrasive resistance against the jacket liner is poor, and in connection with running durability, drop-out undesirably occurs during running.

To the above magnetic layer of the present invention, along with the above ferromagnetic metal powder and binder resin, a lubricant, carbon black, and an abrasive are usually added. In some cases, an anti-static agent, a dispersing agent, and other conventionally appreciated additives are added to impart running properties and durability.

Suitable lubricants to be used in the magnetic layer of the magnetic recording medium of the present invention include silicone oil, graphite, molybdenum disulfide, boron nitride, fluorinated graphite, fluorine alcohol, polyolefin (e.g., polyethylene wax), polyglycol (e.g., polyethylene oxide wax), alkylphosphoric acid esters, polyphenyl ether, tungsten disulfide, fatty acid esters of monobasic fatty acids having 10 to 20 carbon atoms and at least one of monohydric alcohols, dihydric alcohols, trihydric alcohols, tetrahydric alcohols, and hexahydric alcohols, fatty acid esters of monobasic fatty acids having at least 10 carbon atoms and mono- to hexa-hydric alcohols, the total number of carbon atoms being 11 to 28. In addition, fatty acids, fatty acid amide or aliphatic alcohols, having 8 to 22 carbon atoms can be used.

Specific examples of the above-mentioned organic compound lubricants are butyl caprylate, octyl caprylate, ethyl laurate, butyl laurate, octyl laurate, ethyl myristate, butyl myristate, octyl myristate, ethyl palmitate, butyl palmitate, octyl palmitate, ethyl stearate, butyl stearate, octyl stearate, amyl stearate, anhydrosorbitan monostearate, anhydrosorbitan distearate, anhydrosorbitan tristearate, anhydrosorbitan tetrastearate, oleyl oleate, oleyl alcohol, and lauryl alcohol. In addition, other lubricants which can be used in the present invention include so-called lubricant additives, but which can be used alone, including an antioxidant (e.g., alkylphenyl), a rust preventive (e.g., naphthenic acid, alkenylsuccinic acid, or dilauryl phosphate), an oily agent (e.g., rapeseed oil, or lauryl alcohol), a super pressure agent (e.g., dibenzyl sulfide, tricresyl phosphate, or tributyl phosphite), a cleaning dispersant, a viscosity index increasing agent, a flow point decreasing agent, and a defoaming agent. These lubricants are added in an amount of 0.05 to 20 parts by weight per 100 parts by weight of the binder.

As dispersants to be used in the magnetic recording medium of the present invention, fatty acids having 10 to 22 carbon atoms ($R_1COOH$ wherein $R_1$ is an alkyl group having 9 to 21 carbon atoms), such as capric acid, caprylic acid, lauric acid, myristic acid, palmitic acid, stearic acid, oleic acid, elaidic acid, linolic acid, linoleic acid, and stearolic acid; metal soaps comprising alkali metal (e.g., Li, Na, or K), alkali earth metal (e.g., Mg, Ca, or Ba), Cu, or Pb salt of the above fatty acids; and lecithin can be used. In addition, higher alcohols having at least 4 carbon atoms (e.g., butanol, octyl alcohol, or stearyl alcohol), and their sulfuric acid esters, phosphoric acid esters, and the like can be used. These dispersants are added in an amount of 0.005 to 20 parts by weight per 100 parts by weight of the binder. These dispersants may be previously coated on the surface of ferromagnetic fine powder or non-magnetic fine powder, or they may be added in the course of dispersion.

As antistatic agents, electrically conductive powders such as graphite, carbon black, and carbon black-grafted polymers; natural surfactants such as saponin; nonionic surfactants such as alkylene oxidebased surfactants, glycerine-based surfactants, glycidol-based surfactants, polyhydric alcohols, polyhydric alcohol esters, and alkylphenol ethylene oxide adducts; cationic surfactants such as higher alkylamines, cyclic amines, hydantoin derivatives, amideamines, esteramides, quaternary ammonium salts, pyridine and other heterocyclic compounds, and phosphonium or sulfoniums; anionic surfactants containing an acidic group, such as carboxylic acid, sulfonic acid, phosphoric acid, or a sulfuric acid ester group; and amphoteric surfactants such as aminoacids; aminosulfonic acids, sulfuric acid esters of aminoalcohols, and alkylbetain can be used.

Abrasive agents which can be used in the magnetic recording medium of the present invention include commonly used materials having an abrasive action. For example, $\alpha$-alumina, fused alumina, silicon carbide, chromium oxide, cerium oxide, corundum, synthetic diamond, $\alpha$-iron oxide, garnet, emery (main component: corunum and magnetite), garnet, silica, silicon nitride, boron nitride, molybdenum carbide, boron carbide, tungsten carbide, titanium carbide, tripoli, diatomaceous earth, and dolomite can be used. Generally, materials having a Mohs' hardness of at least 6 are used singly or as mixtures comprising two or more thereof. As these abrasives, those having an average grain size of 0.005 to 5 microns are used, with those having an average grain size of 0.05 to 2 microns being particularly preferred. These abrasives are added in an amount of 1 to 25 parts by weight per 100 parts by weight of the binder, with the range of 8 to 20 parts by weight being particularly preferred.

As the non-magnetic support to be used in the magnetic recording medium of the present invention, synthetic resin films such as polyethylene terephthalate, polycarbonate, polyamide, and poloyimide, and metal foils such as an aluminum foil and a stainless foil can be used.

As the carbon black to be used in the present invention, furnace carbon black for rubber, thermal carbon black for rubber, carbon black for color, acetylene carbon black, and the like can be used. Specific examples of suitale carbon black, in the abbreviated form in the United States, are SAF, ISAF, IISAF, T, HAF, SPF, FF, FEF, HMF, GPF, APF, SRF, MPF, ECF, SCF, CF, FT, MT, HCC, HCF, MCF, LFF, and RCF. Those classified into D-1765-82a of ASTM Standards of U.S.A. can be used. In these carbon blacks to be used in the present invention, the average grain size is 5 to 1,000 millimicros (as determined under an electron microscope), the specific surface area (as determined by the nitrogen absorption method) is 1 to 800 $m^2/g$, the pH (as determined according to JIS K-6221-1982) is 4 to 11, and the dibutyl phthalate (DBP) oil absorption amount (as determined according to JIS K-6221-1982) is 10 to 800 ml/100 g.

In connection with the size of carbon black to be used in the present invention, for the purpose of decreasing the surface electric resistance of the coated film, carbon black having a size of 5 to 100 millimicrons is used. When the strength of the coated film is intended to be controlled, carbon black having a size of 50 to 1,000 millimicrons is used. For the purpose of controlling the surface roughness of the coated film, it is effective to use in combination finer carbon black (not more than 100 millimicrons) for smoothening to reduce the spacing loss, or for the purpose of decreasing the coefficient of friction by surface-roughening, it is effective to use coarse carbon black (at least 50 millimicrons).

In connection with the surface roughness of the magnetic layer of the magnetic recording medium of the present invention, the average roughness along the central line (Ra) is 0.005 to 0.02 μm and preferably 0.005 to 0.015 μm (cut off value: 0.25 ml).

In providing a magnetic layer containing a ferromagnetic metal powder, a binder resin, carbon black, and additives such as esterified products as described above on a non-magnetic support, the above ingredients are added to an organic solvent and dispersed therein to prepare a magnetic coating solution, and the coating solution thus obtained is then coated on the non-magnetic support and dried.

Organic solvents which can be used in preparation of the magnetic coating solution include ketones such as acetone, methyl ethyl ketone, methyl isobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, ethyl acetate, butyl acetate, isobutyl acetate, isopropyl acetate, ethyl lactate, glycol acetate, and monoethyl ether; glycol ethers such as ether, glycol dimethyl ether, glycol monoethyl ether, and dioxane; tars (aromatic hydrocarbons) such as benzene, toluene, xylene, cresol, chlorobenzene, and styrene; chlorinated hydrocarbons such as methylene chloride, ethylene chloride, carbon tetrachloride, chloroform, ethylenechlorohydrin, and dichlorobenzene; N,N-dimethylformaldehyde; and hexane. These solvents can be used in any desired proportions.

In kneading, the magnetic substance and the aforementioned components are introduced into a kneader, at the same time or successively. For example, there can be employed a method in which the magnetic substance is added to a solvent containing a dispersant and kneaded for a predetermined time to form a magnetic coating solution.

In kneading for preparation of the magnetic paint, various kneaders can be used, including a two-roll mill, three-roll mill, a ball mill, a pebble mill, a tron mill, a sand grinder, a Szegvari attritor, a high-speed impeller dispersing machine, a high-speed stone mill, a high-speed impact mill, a disper, a kneader, a high-speed mixer, a homogenizer, and a supersonic dispersing machine.

Kneading and dispersion can be carried out by a method chosen from those described in T. C. Patten, *Flow of Paint and Pigment Dispersion* (1975). Two or more layers may be provided at the same time by the multilayer simultaneous coating method known in the art.

In the magnetic recording medium of the present invention, the dry thickness of the magnetic layer is within a range of about 0.5 to 12 μm. In the case of a multiple layer, the total thickness is within the above specified range. The dry thickness is determined depending on the use, shape, standards and the like of the magnetic recording medium.

The magnetic layer provided on the non-magnetic support by the above method is subjected to a treatment to orient magnetic substances in the layer, if necessary, and then dried. By applying a surface smoothening treatment, if necessary, and cutting into the desired shape, the magnetic recording medium of the present invention is obtained.

It has been found according to the present invention that the surface smoothening treatment of the magnetic layer provides a magnetic recording medium having a smooth surface and having excellent abrasive characteristics. This surface smoothening treatment is achieved by conducting a smoothening treatment prior to drying, or a calendering treatment after drying.

In accordance with the present invention, in the magnetic disc comprising the non-magnetic support and the magnetic layer composed mainly of the needle-like ferromagnetic metal powder and the binder as provided on the support, the metal powder has a pH value of less than 7.0 and a specific surface area as determined by the BET method of at least 40 m$^2$/g, and the glass transition temperature of the magnetic layer is at least 75° C. Thus the magnetic recording medium of the present invention is good in electromagnetic properties, is excellent in abrasive resistance against the jacket liner of the floppy disc, and thus is improved in durability.

The present invention is described in greater detail with reference to the following examples. However, the present invention is not be construed as limited in any way by the illustrative examples below.

EXAMPLE 1

The following ingredients were kneaded for about one hour in a kneader to prepare a composition.

|  | (by weight) |
|---|---|
| Ferromagnetic metal powder (Fe 99%, Ni 1%, pH 6.5, specific surface area m$^2$/g, coercive force 1,580 Oe, saturated magnetization value 135 emu/g) | 100 parts |
| Polar group-containing vinyl chloride copolymer (—SO$_3$Na group 5.8 × 10$^{-5}$ equivalent/g, number average molecular weight 75,000, glass transition temperature 78° C.) | 14.0 parts |
| Cr$_2$O$_3$ (average grain size 0.5 μm) | 15 parts |
| Carbon black (manufactured by Lion Agzo Co., Ltd., ketting black EC, average grain size 30 μm) | 10 parts |
| Carbon black (manufactured by Cacarb Corp., thermax MT, average grain size 280 μm) | 3 parts |
| Toluene | 36 parts |
| Methyl ethyl ketone | 36 parts |

To the above composition were added ingredients shown below, and the resulting mixture was subjected to dispersion treatment at 2,000 rpm for about two hours by the use of a sand grinder to obtain a uniform dispersion.

| Polar group-containing polyester polyurethane resin (—SO$_3$Na group 1 × 10$^{-4}$ equivalent/g, weight average molecular weight 35,000, glass transition temperature 37° C.) | 5.0 parts |
|---|---|
| Methyl ethyl ketone | 250 parts |
| Toluene | 50 parts |
| To the dispersion thus prepared, the following ingredients were added. | |
| Polyisocyanate (manufactured by Nippon Polyurethane Co., Ltd., | 11.0 parts |

| -continued | |
|---|---|
| Coronate L) | |
| Tridecyl stearate | 11 parts |

The resulting mixture was mixed to prepare a magnetic coating solution.

This magnetic coating solution was coated on both sides of a polyethylene terephthalate film (width 30 cm, thickness 75 μm) by the use of a gravure roll in such a manner that the dry thickness was 3 μm, was dried at about 100° C., and then the coated film was subjected to calendering treatment at about 100° C. to obtain a metal powder-containing magnetic recording medium.

This magnetic recording medium was punched into a disc 3.5 inch in diameter to obtain a floppy disc sample placed in a jacket using a No. 9246 liner (manufactured by Kendall Corp.).

The specific surface areas of the above ferromagnetic metal powder was measured by the BET point method (partial pressure 0.30) using Canter Leeve (manufactured by U.S. Canter Chromium Corp.) and under conditions of 250° C. and nitrogen atmosphere for 30 minutes. The pH was measured by the use of a pH meter (manufactured by Horiba Seisakusho Co., Ltd.).

The glass transition temperature of the polar group-containing vinyl chloride copolymer or the polar group-containing polyester polyurethane used as the binder resin was measured by coating a resin sample on a releasing paper in a dry thickness of 30 μm, drying at 100° C. for 24 hours to obtain a single binder layer, and measuring the glass transition temperature of the layer by the use of RHEVIBRON (manufactured by TOYO BOLDWIN Co., Ltd.) under conditions of frequency 110 Hz, temperature raising speed 2° C./min.

The glass transition temperature of the magnetic layer of the above magnetic recording medium as obtained above was measured by the following method and found to be 76° C.

Measurement of Glass Transition Temperature of Magnetic Layer

The above magnetic coating solution was coated on one side of a polyimide film (width 30 cm, thickness 15 μm) in a dry thickness of 10 μm by gravure coating under the substantially same conditions as in the above magnetic recording medium, was dried at about 100° C, and then was subjected to press molding treatment by the use of calender rolls at about 100° C. to form a sample for measurement of the glass transition temperature.

Then the above sample was measured for glass transition temperature by the use of RHEOVIBRON (manufactured by TOYO BOLDWIN Co., Ltd.) under conditions of frequency 110 Hz, temperature raising speed 2° C./min.

EXAMPLE 2

A floppy disc sample was produced in the same manner as in Example 1 except that as the ferromagnetic metal powder, the following ferromagnetic metal powder was used instead in the amount of 100 parts by weight.

Ferromagnetic Metal Powder

Fe 99%, Ni 1%
pH 5.5
Specific surface area 60 $m^2/g$
Coercive Force 1,570 Oe
Saturated magnetization amount 135 emu/g
The glass transition temperature of the magnetic layer was 76° C.

EXAMPLE 3

A floppy disc sample was produced in the same manner as in Example 1 except that 5.0 parts by weight of the polyesterpolyurethane resin shown below was used in place of the polar group-containing polyesterpolyurethane resin.

Polyesterpolyurethane Resin

Containing no polar group.
Weight average molecular weight 85,000
Glass transition temperature 67° C.
The glass transition temperature of the magnetic layer was 84° C.

EXAMPLE 4

A floppy disc sample was produced in the same manner as in Example 1 except that 14 parts by weight of the resin shown below was used in place of the polar group-containing vinyl chloride copolymer.

Cellulose Acetate Propionate

Containing no polar group.
Weight average molecular weight 75,000
Glass transition temperature 155° C.
The glass transition temperature of the magnetic layer was 140° C.

COMPARATIVE EXAMPLE 1

A floppy disc sample was produced in the same manner as in Example 1 except that 100 parts by weight of the ferromagnetic metal powder shown below was used instead as the ferromagnetic metal powder.

Ferromagnetic Metal Powder

Fe 99%, Ni 1%
pH 9.5
Specific surface area 40 $m^2/g$
Coercive Force 1,580 Oe
Saturated magnetization amount 130 emu/g
The glass transition temperature of the magnetic layer was 76° C.

COMPARATIVE EXAMPLE 2

A floppy disc sample was produced in the same manner as in Example 1 except that 100 parts by weight of a ferromagnetic metal powder shown below was used instead as the ferromagnetic metal powder.

Ferromagnetic Metal Powder

Fe 99%, Ni 1%
pH 8.8
Specific surface area 60 $m^2/g$
Coercive Force 1,570 Oe
Saturated magnetization amount 125 emu/g
The glass transition temperature of the magnetic layer was 76° C.

COMPARATIVE EXAMPLE 3

A floppy disc sample was produced in the same manner as in Example 1 except that 100 parts by weight of the ferromagnetic metal powder shown below was used instead as the ferromagnetic metal powder.

Ferromagnetic Metal Powder

Fe 99%, Ni 1%
pH 9.5
Specific surface area 40 m²/g
Coercive Force 1,580 Oe
Saturated magnetization amount 130 emu/g The glass transition temperature of the magnetic layer was 140° C.

COMPARATIVE EXAMPLE 4

A floppy disc sample was produced in the same manner as in Example 1 except that the amounts of the polar group-containing vinyl chloride copolymer and the polar group-containing polyesterpolyurethane used were changed as shown below.

|  | (by weight) |
| --- | --- |
| Polar group-containing vinyl chloride copolymer | 9.0 parts |
| Polar group-containing polyesterpolyurethane | 10.0 parts |

The glass transition temperature of the magnetic layer was 70° C.

COMPARATIVE EXAMPLE 5

A floppy disc sample was produced in the same manner as in Example 1 except that 5.0 parts by weight of a polyurethane resin shown below was used in place of the polar group-containing polyesterpolyurethane resin.

Polyurethane Resin

Containing no polar group.
Weight average molecular weight 60,000
Glass transition temperature −22° C.

The glass transition temperature of the magnetic layer was 63° C.

COMPARATIVE EXAMPLE 6

A floppy disc sample was produced in the same manner as in Example 1 except that 100 parts by weight of the ferromagnetic metal powder shown below was used instead as the ferromagnetic metal powder.

Ferromagnetic Metal Powder

Fe 99%, Ni 1%
pH 6.5
Specific surface area 30 m²/1 g
Coercive Force 1,580 Oe
Saturated magnetization amount 138 emu/g The glass transition temperature of the magnetic layer was 77° C.

Each 3.5-inch floppy disc sample as obtained above was placed in a floppy disc drive FD1135 D manufactured by Nippon Denki Co., Ltd.) and driven. Driving circumstances were changed between temperature 5° C., humidity 10% and temperature 60° C., relative humidity 20% for 24 hours according to the following flow cycle.

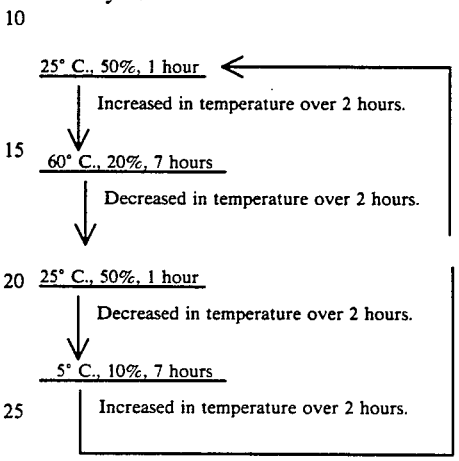

In this manner, the sample was subjected to a thermocycle test.

The head was positioned at Track 13. Under such conditions, each sample was run at the max. 25,000,000 passes. Based on the results, running durability was evaluated.

The output of all tracks was checked at every 5,000,000 pass intervals. When the output was not more than 45% of the initial value, it was evaluated that the drop out was formed.

Electromagnetic properties were evaluated based on a value of the initial 2f output when the 2f (1,250 kbps) output of the floppy disc sample of Example 1 was 100%.

The above measurement was conducted by measuring the 2f reproduction output at the innermost track while driving in a floppy disc drive FD1331 (manufactured by Nippon Denki Co., Ltd.).

In connection with dissolving power, the evaluation was conducted with that of the sample of Example 1 used as a 100% benchmark.

Using the drive as in measurement of the initial 2f output, the 2f output at the innermost track was divided by the 1f (625 kbps) output at the innermost track. This value was deemed as a dissolving ability.

The results are shown in Table 1.

TABLE 1

| Sample | Electromagnetic Properties | | Running Durability | |
| --- | --- | --- | --- | --- |
|  | Initial 2f Output | Dissolving Power | Number of Runnings | Drop out |
| Example 1 | 100 | 100 | No abnormality | Not formed |
| 2 | 98 | 102 | " | " |
| 3 | 99 | 98 | " | " |
| 4 | 97 | 98 | " | " |
| Comparative |  |  |  |  |
| Example 1 | 97 | 101 | " | Formed after 10,000,000 pass |
| 2 | 94 | 103 | " | Formed after 7,500,000 pass |
| 3 | 96 | 99 | " | Formed after 12,000,000 pass |
| 4 | 102 | 102 | " | Formed after 5,000,000 pass |
| 5 | 102 | 102 | " | Formed after 3,000,000 pass |

TABLE 1-continued

| | Electromagnetic Properties | | Running Durability | |
|---|---|---|---|---|
| Sample | Initial 2f Output | Dissolving Power | Number of Runnings | Drop out |
| 6 | 102 | 94 | " | Not formed |

While the invention has been described in detail and with reference to specific embodiments thereof, it will be apparent to one skilled in the art that various changes and modifications can be made therein without departing from the spirit and scope thereof.

What is claimed is:

1. A magnetic disc comprising a non-magnetic support and a magnetic layer on the non-magnetic support, wherein said magnetic layer is comprised of a ferromagnetic metal powder and a binder resin, and wherein said ferromagnetic metal powder has a pH value of less than 7.0 and a specific surface area as determined by the BET method of at least 40 m$^2$/g, and said magnetic layer has a glass transition temperature of at least 75° C.

2. A magnetic disc as in claim 1, wherein the specific surface area is 40 to 60 m$^2$/g.

3. A magnetic disc as in claim 1, wherein said ferromagnetic metal powder has a crystal size of no more than 400 Å.

4. A magnetic disc as in claim 1, wherein said ferromagnetic metal powder is selected from the group consisting of Fe, Fe-Co, Fe-Ni and Fe-Ni-Co.

5. A magnetic disc as in claim 1, wherein said ferromagnetic metal powder has a saturation magnetization of at least 110 emu/g and a coercive force of at least 800 Oe.

6. A magnetic disc as in claim 1, wherein said ferromagnetic metal powder has a pH value of less than 6.8.

7. A magnetic disc as in claim 1, wherein said ferromagnetic metal powder has a pH value of at least 5 or more.

8. A magnetic disc as in claim 1, wherein said ferromagnetic metal powder has a pH value of from 5 to 6.8.

9. A magnetic disc as in claim 1, wherein said magnetic layer has a glass transition temperature of from 80° to 160° C.

10. A magnetic disc as in claim 1, wherein said magnetic layer has a glass transition temperature of from 120° to 150° C.

11. A magnetic disc as in claim 1, wherein said magnetic layer has a dried thickness of from about 0.5 to 12 μm.

12. A magnetic disc as in claim 1, wherein said magnetic layer comprises multiple layers.

13. A magnetic disc as in claim 1, wherein said binder resin is a mixture of 30 to 60 wt% of a vinyl chloride copolymer, 10 to 40 wt% of a polyurethane resin, and 20 to 50 wt% of a polyisocyanate.

14. A magnetic disc as in claim 1, wherein said binder resin is a mixture of 30 to 60 wt% of a cellulose derivative, 10 to 40 wt% of a polyurethane resin and 10 to 40 wt% of a polyisocyanate.

* * * * *